(12) United States Patent
DeWaard (10) Patent No.: US 11,122,767 B2
(45) Date of Patent: Sep. 21, 2021

(54) CLOSED-LOOP, SHORT INTERVAL FLUSHING METHOD AND SYSTEM FOR USE IN AUTOMATED MILKING SYSTEM DAIRIES

(71) Applicant: Dari-Tech, Inc., Lynden, WA (US)

(72) Inventor: David DeWaard, Lynden, WA (US)

(73) Assignee: Dari-Tech, Inc., Lynden, WA (US)

( * ) Notice: Subject to any disclaimer, the term of this patent is extended or adjusted under 35 U.S.C. 154(b) by 125 days.

(21) Appl. No.: 16/707,243

(22) Filed: Dec. 9, 2019

(65) Prior Publication Data

US 2020/0113148 A1 Apr. 16, 2020

Related U.S. Application Data

(63) Continuation of application No. 15/900,139, filed on Feb. 20, 2018, now Pat. No. 10,609,892.

(51) Int. Cl.
*A01J 7/02* (2006.01)
*B08B 3/02* (2006.01)
*B08B 3/14* (2006.01)
*A01K 1/12* (2006.01)

(52) U.S. Cl.
CPC ............... *A01J 7/022* (2013.01); *A01K 1/12* (2013.01); *B08B 3/02* (2013.01); *B08B 3/14* (2013.01)

(58) Field of Classification Search
CPC ... A01J 7/022; A01K 1/12; B08B 3/02; B08B 3/14
See application file for complete search history.

(56) References Cited

U.S. PATENT DOCUMENTS

| | | |
|---|---|---|
| 3,137,270 A | 6/1964 | Rigterink |
| 2006/0048469 A1 | 3/2006 | MacLean et al. |
| 2009/0241442 A1 | 10/2009 | MacLean et al. |
| 2011/0253227 A1 | 10/2011 | DeWaard |
| 2012/0017836 A1 | 1/2012 | Torgerson et al. |
| 2017/0231186 A1 | 8/2017 | Rousseau et al. |

*Primary Examiner* — Benjamin L Osterhout
(74) *Attorney, Agent, or Firm* — Williams Kastner & Gibbs PLLC; Mark Lawrence Lorbiecki (57) ABSTRACT

A method and system for flushing an area of a robotic harvest dairy barn is presented. The method is based upon defining areas within the dairy barn that, by virtue of use of robots for "cow-initiated" milking will be maintained in a hygienically clean and dry condition with frequent flushings of short duration. The four areas of the barn felt to benefit from this frequent flushing including any of: an area immediately surrounding a robot; a holding area for staging cows for milking at the robot; a robot control room; and a milk collection room. In the relevant areas the flooring deck is configured to slope at its upper surface to define a drain area, the drain area including at least one grated drain positioned to collect any liquid deposited on the upper surface of the provided flooring deck. A collecting pipe network conducts liquid collected to a baffled tank.

19 Claims, 6 Drawing Sheets

CLOSED-LOOP, SHORT INTERVAL FLUSHING METHOD AND SYSTEM FOR USE IN AUTOMATED MILKING SYSTEM DAIRIES

FIELD OF THE INVENTION

The method and system implicates closed-loop flush technology for dairy barns, specifically short interval flushing of deck surfaces regulated nozzles.

BACKGROUND OF THE INVENTION

A trend in modern dairies is to rely upon robotic or automated milking systems because these milking robots can significantly reduce labor costs and demands in milk harvest. One reason frequently given for considering an automated milking system (AMS) is a reduction in the labor force necessary for the farm. Another reason sometimes given is that a smaller farm can consider expansion of cow numbers without a large change in its labor force. The reason for the labor savings is that most milking cows of the dairy herd will visit the robot milking machines voluntarily and that the robot will, without manual assistance, milk the visiting cow. The milking occurs throughout the day and is enabled by the cows' unobstructed access to the robots.

By contrast, in most dairy farms exploiting a conventional milking parlor configuration, laborers will take advantage of the scheduled movement of the herd through the parlor in order to scrape alleys, dress stalls and maybe even put down fresh feed. While the cows are out of the way, it is easy to run a skid steer loader and dress the empty stalls. But, this method of cleaning the area around the robots will not be available in AMS barns both, because the presence of the skid steer loader will discourage cows seeking access to the robot, and because the herd is never in a single location, such as in the free-stalls leaving the robot milking parlor. The two methods of operation are not consistent, with the same methods of hygiene for the herd and barn. Movement of cows follow distinct patterns in each of the two types of barns, i.e. AMS and conventional herringbone milking parlors. Specifically, cows want to go to be milked, in an AMS barn, whenever they want. Obstructing their progress towards the robots will cause cows to yield less milk with real economic impact on the dairy.

Just as economic factors drive dairymen to consider a conversion to AMS, economic factors also drive barn design changes to afford lactating cows unfettered access to the robots. By conventional design, the principal driver is the placement of gutters and floors necessary to optimally clean the barn. This tends to place the milking parlor as far from the free stalls as possible to allow cleaning in shifts, i.e. when the cows are being milked, the stalls and alleys are cleaned. When the cows are in the stalls, the parlor is cleaned. Redesigning the barn to accommodate AMS generally means placing the robots and the floor area immediately proximate to the robots as well as a the staging or holding area by which cows approach the robots (together referred to as the "robotic milking parlor" herein) in a central location in the barn. Thus, cows can reach the robots through various and convenient paths from their free-stalls.

In AMS barns, however, that the robotic milking parlor is centrally located means that it bears the greatest volume of traffic within the barn. In contrast to the alleys and lanes proximate to the stalls or cubicles, the traffic in the robotic milking parlor is concentrated along the track to and from the robots and is exposed to more manure. Even, when compared to a conventional dairy barn, the robotic parlor bears more traffic than a conventional herringbone parlor. The average AMS milking frequency is 2.8 times a day, with a range of 2.4 to 3.2, in contrast to the twice-daily milkings common in a conventional dairy.

To clean this highly trafficked area, the conventional methods have been to scrape the flooring decking between each milking, to flush the decking with water from a hose, or a combination of scraping and flushing. In many barns, this simply means moving some of the labor from milking to cleaning. Less labor than the several persons used for conventional milking, but constant labor given cow-initiated milking. One solution has been to automatically flush the robot area with a large volume of water twice a day. Unfortunately, this has proven largely impractical.

AMS barns using conventional flush techniques do not prevent the cows from visiting the milking robots as cows are willing to walk through a volume of water consistent with flushing by conventional methods. However, a volume sufficient to entrain trod-in and dried manure is also enough to wet hooves and to splash onto teats. Pooling on the floor in the robotic milking parlor presents a significant risk of either foot rot or mastitis. (Mastitis is an inflammation of the mammary gland or udder. Mastitis in dairy cows is caused by udder infections, usually resulting from bacteria introduced either during the milking process or from environmental contact. Examples include contamination from milking equipment, milking personnel, manure contamination or dirty stalls.) With greater traffic, the volume of deposited contamination including contamination by dirt and manure is necessarily greater as well. But the greater volume of water used means a greater risk of disease.

Maintaining the cleanliness of the floor area within the robotic milking parlor without the risk of disease becomes an important objective and, in AMS dairies, is conventionally met by providing a laborer to either scrape or to hose flush this parlor area frequently during periods when the robots are in use. And as stated above, this must be performed continuously, as restricting the cows' access to the robots, any more than is necessary, adversely impacts either of harvested milk volumes or of health of the herd. For that reason, conventional means of keeping the robotic milking parlor optimally clean also means employing such additional help as is necessary to scrape or hose down the periphery of the robotic milking parlor.

Battle lines in the debate over cleaning dairy barns continues to rage over the relative advantages of scrape and of flush cleaning. Cows have proven themselves tolerant of alley scrapers and of flush techniques so long as there is an alternate path to or from their stalls. But since the free-stall area of a robotic barn is never free from cows, cleaning with a tractor or skid steer is not recommended as it either distresses the cows or interferes with their access to the robot. And, the layout of many robotic barns makes it difficult to clean the barn using traditional cable drawn alley scrapers, because barn layouts make use of large open areas in the robotic milking parlor and often have larger crossovers than in parlor barns.

Recognizing the issues presented by the area around the robots in an AMS barn, dairymen have attempted to adapt several convention means of cleaning which fall into four categories:
scrape (mechanical);
slatted floor manure systems;
flush (hydraulic); or
a scrape-flush combination.

Scrape or mechanical collection involves the removal of the manure from the robotic milking parlor by manual or mechanic movement of a blade over the surface. Scraping requires using some pushing means. Mechanical scrapers have the advantage of providing automatic mechanized rapid removal of manure. Mechanical scraping is the cheapest method and is the only option for nonconcrete surfaces. In the context of a robotic milking system, the preferred method is by a blade or a scrape driven by a pulley system. While such systems interfere with cows access to the milking robots, the interference is less than by skid steer scraping.

Slatted-floor barns originally were designed with narrow alleyways that concentrated cow traffic to push the manure through the slats. As interest in cow comfort increased and lying times in stalls lengthened, reduced cow movement in the alleys resulted in a greater build-up of manure in the alleyways. The most effective way to deal with this manure build-up is to use some form of scraper to push the manure down through the slats.

In conjunction with slatted-floor barns, scrapers drawn by a cable or a pushed by a shuttle drive are the most popular. These scrapers do not have to be as rugged as regular alley scrapers since they do not drag manure down the barn alley, but rather push the manure through the slats. Automatic scrapers are effective in pushing manure through slats, but they still involve cables or shuttle arms that have to be maintained as well as corner wheels or other drive mechanisms that have to be installed outside the cow area so as not to be a hazard to cow traffic, adding to the size of the barn.

Flush, or hydraulic, manure collection exploits a flow of water to entrain and convey manure and dirt out of the robotic milking parlor. Such a flow comes, in a conventional dairy barn, through hoses manually directed, urging manure into gutters to be conveyed to manure storage lagoons. As in any dairy, water plays a crucial role in the cleaning of both the milking robots and the stalls and alleys. Water transports heat energy and cleaning chemicals used in robotic machine cleaning; water volume and flow rate creates turbulence—a "scrubbing" action or lifting force; water carries away milk residue, yard debris, and, especially, manure.

Conventional flush systems require a large volume of water to clean properly. Most systems use some form of solid-liquid separation to reclaim water, then recycle the separated liquids to be used as flush water. The cleaner the flush water is, the better the job it will do in cleaning the floors. If there is too much manure left in the flush water, a scum will build up on the floors over time, making them quite slippery. More cleaning means less disease, fewer cleanings may conserve water but they also result in higher bacteria counts meaning reduced milk quality. The conventional means of high volume flush cleaning has been set out above.

Importantly, with each of the methods set out above, the use of the method must not interfere with the cow's free use of the robots. Any such interference that might impede the free use of the robots, might also prevent the greater milk volume that adoption of robotic milking promises. What is needed in the art, therefore, is an automated means of removing manure from the heavily trafficked area proximate to the milking robots without requiring labor or allowing excessive water to contact hooves or teats.

SUMMARY OF THE INVENTION

A method and system for flushing an area of a robotic harvest dairy barn is presented. The method is based upon defining areas within the dairy barn that, by virtue of use of robots for "cow-initiated" milking will be maintained in a hygienically clean condition with frequent flushings of short duration. The as many as three areas of the barn felt to benefit from this frequent flushing including any of: an area immediately surrounding a robot; a holding area for staging cows for milking at the robot; and, where present a dairy sort area. In the relevant areas the flooring deck is configured to slope at its upper surface to define a drain area, the drain area including at least one grated drain positioned to collect any liquid deposited on the upper surface of the provided flooring deck. A collecting pipe network is relied upon to conduct liquid collected in the at least one grated drain to a baffled tank.

The baffled tank used to collect liquid from the collecting pipe network, is a reservoir to feed a distribution network. The baffled tank is selected to enable particulate to settle, under the influence of gravity, out of the collected flush water making the flush water suitable for reuse.

A distribution network initiating at the baffled tank and terminating in at least one regulated nozzle positioned in at least one provided flooring deck to flush that flooring deck. The distribution network periodically flushes the flooring deck in order to prevent manure from becoming either dried or ground in, preserving a hygienically clean and dry deck surface. Periodic flush occurs when at least one valve within the distribution network is activated, opening and feeding several regulated nozzles each to direct a flow of flush water from the baffled tank over the deck surface. To assure clean deck surfaces, the activating of the at least one valve within the distribution network is accomplished with a periodic frequency of at least twice an hour during operation and having an interval of no more than five minutes.

The baffled tank encloses a settling chamber which allows dissipation of turbulence and the driving off of entrained air from collected flushing water. A number of configurations for the settling chamber including a pipe of selected diameter in a vertical attitude can be used. However, in a preferred embodiment, the baffled tank includes an input chamber defined by a portion of a side wall of the tank and an input side of a bulkhead the tank contains a reservoir chamber defined by a further portion of the side wall and a reservoir side of the bulkhead. A slurry basin is situated beneath each of the input and reservoir chambers and defined by a still further portion of the side wall and the bottom wall. Again, while several configurations are possible, including a flat bottom wall, in a preferred embodiment the bottom wall is configured in a generally inverted conical shape. The slurry basin configured to receive settled particulate from either of the input chamber or the reservoir chamber within the tank and collect it there for removal from the tank through a waste conduit.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Whether it is washing teats, cleaning the machines or hosing out yards, water plays a key role in the dairy barn. A reliable, high quality water supply is essential to dairy farms. Water is used for animal consumption, milk cooling, cleaning and sanitizing equipment, cow cooling, irrigating crops, producing value added products, moving manure and cleaning the barns via flush systems. Academic studies have shown that the flush cleaning water demand in an automatic milking system ("AMS") dairy is lower per cow per day than in the herringbone parlor dairy.

A further observation undergirds this invention—using a closed-loop, short interval flushing method and system in the area immediately proximate to the robots will produce a markedly cleaner flush water when collected at drains within the area than flush water collected in the freestall area of a dairy barn. It stands to reason that where washings are far more frequent, as in the robot area, the amount of manure and soil collected in each washing will be far less than collected in conventional intervals. The instant invention exploits that collected cleaner water for periodic flushing rather than to allow it to mix with other water collected from a conventional herringbone parlor that is conventionally kept in lagoon storage. Such water from a conventional herringbone parlor contains significantly more particulate. This invention entails segregating this cleaner water.

Water is a resource in a dairy and clean water comes at a premium. This water is segregated from the remainder of the flush water (in the case where other flush water is used—the instant invention can also be used in the context of a scrape dairy with no significant modification) and used, only, to clean this same area. Recycling the water according to the instant invention is by separate tanks, pumps, nozzles and drains in a close-loop system.

Using any water for flushing a dairy barn has a cost including, pumping, waste water storage structures as well as transportation and application or disposal of excess water. The excessive use of water has a significant and adverse economic effect on the operation of a dairy. One of the key issues in managing dairy herds today is the creation and maintenance of capacity to store manure and waste water until it can be land-applied. The additional volume of wash water can diminish capacity of storage lagoons by between 25% to 50%. This wash water adds little nutritional value and can cause the manure to run-off and infiltrate into the ground water if not properly applied.

The instant invention recognizes that, as stated above in the Background Section, the area immediately adjacent to the robot or robots receives the greatest and most consistent traffic in the AMS dairy. Recognizing that fact, leads to a further conclusion, the area adjacent to the robots will always become soiled in a consistent manner and according to a consistent pattern, that is to say that because cows always approach the robot from the holding area and leave towards the alleys. Because the whole of that area is flooring decked, the only mud in the area is that tracked in from beyond the holding pen. If the flooring decking along the path of the cows can be kept clean with a minimum of flushing water, the cows have few opportunities to soil that path. What soil is deposited there, whether manure or mud, will generally conform to a certain type, moist and thin. The content will be distinct from that found in the alleys generally. An object of the invention is to preserve the relative cleanliness of the area around the robot by frequent, targeted, and regulated flushing, and then, because of the relatively slight proportion of collected flush water that is manure, the settling of this manure from the collected flush, and then to reuse this water for flushing again.

Figure 1:
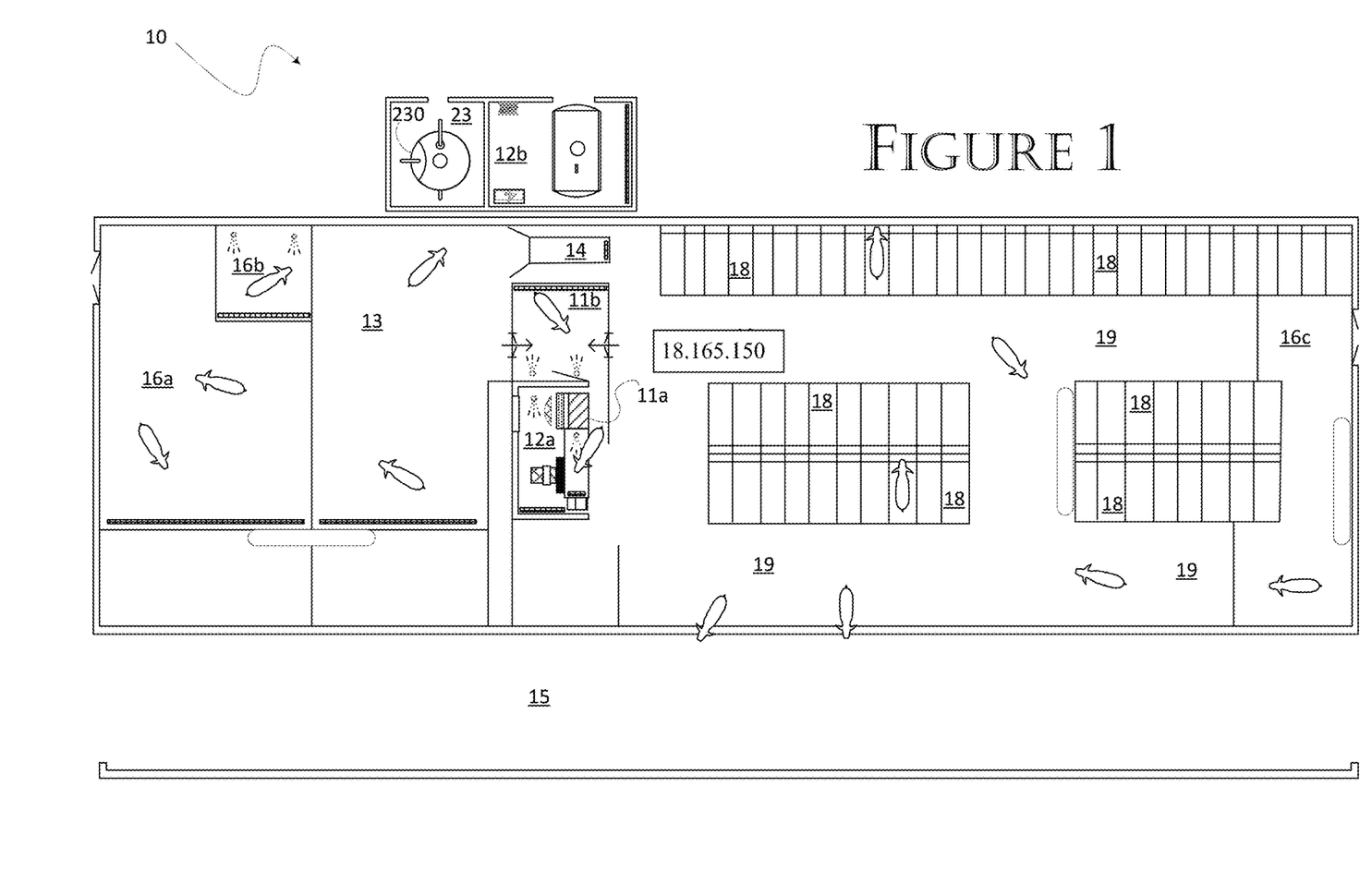
FIG. 1 is a plan-view of an exemplary single robot AMS dairy barn.

To aid in the understanding of the present invention, the inventor proposes a hypothetical AMS dairy barn as is portrayed in FIG. 1. Unlike the regular cleaning of the free stalls and alleyways, the robot or robots (where referred to in the singular, no limitation to a single robot is intended and might be understood as either of robot or robots, wherever used herein.), are washed on a different schedule. For example, the robot washes itself between each cow and shuts down two times a day for a more thorough cleaning to ensure sanitary milk harvest. On average, cows are milked 2.5 times per day, with some cows able to be milked up to six times per day. Because of the nature of "cow-elected" milking frequency, there is no firmly scheduled milking and, therefore, cleaning schedule for the between milking cleaning. As a rough measure, each robot can milk up to 60 cows in the winter or 85 cows when on pasture. These washings deposit a significant volume of relatively clean water on the deck in the proximity of the robot.

It is important to appreciate the load that robots place on a conventional flush washdown system. In a conventional flush dairy, all flush water used throughout the barn is sent to the same place—either to separation for reclamation or is sent to a lagoon for storage. Collecting the water from flushing the area around the robots can overwhelm the lagoon. The frequent flushes necessary to hygienically operate the robot, deposits a great deal water into the storage lagoon. Once in the lagoon, all water becomes of a like grade. If, rather than to storage, recaptured flush water is sent to be separated, as by a centrifuge, the water is simply removed, again, from the manure, but at the expense of running the centrifuge.

Returning, then, to FIG. 1, an exemplary barn layout 10 for an AMS dairy barn is proposed for discussion. The inventor has no intent to limit the invention, strictly, to this exact configuration but proposes the exemplary barn layout 10 as a basis for discussion of the more generalized concepts of the invention. As set out above, it is the robot 11a that drives the design of the dairy barn. The robot 11a is placed to define a robot control room 12a. The robot 11a has numerous controls and thus the area adjacent to the robot area includes a control room 12a opposite the entry side of the robot 11a. The robot control room 12a is outside of the cow traffic pattern and like a milk room 12 designed only to admit the dairyman. Because the traffic of cows through the robot 11a is on the opposite side, the robot 11a is situated to protect the interior of the robot control room 12a and is furnished with easy to clean floor, ceiling and walls. The entrance to the control room is kept clean and dry and inaccessible to cattle. It is important to keep this area clean and to avoid dragging manure and the associated diseases of adult animals into the calf area (for example when collecting colostrum). Generally, the control room is placed so that it may be reached via the feeding alley or from outside of the dairy barn to minimize the spreading of disease and tracking of soil into the room.

The key to making "cow-elected" milking work is to provide lots of open deck space and escape routes in front of the robots. According to one known rule of thumb, the designer provides 20 feet from the milking box to the first free stall, with cow brushes, pasture selection gates and computer feeders located far away from this area to spread out barn activity. For that reason, the milk room 12b is placed on the periphery of the cleaner territory surrounding the robot. Thus, the surface extending from the robot 11a remains clean due to frequent flushing and placing this milk room 12b its periphery minimizes tracked in soil. The milk room 12b must be kept clean and tidy at all times. Washing of the interior of the milk room very much depends on local regulations but, generally, the floor, walls and ceiling are selected to be easy to clean, so that the milk room 12b is easy to keep clean. Just like the area immediately proximate to the robot 11a, wash down water from hoses used to keep the milk room clean has nearly no contaminant in it.

Shown here as typical in the AMS dairy, the exemplary barn includes an automatic fence that opens at a signal from the robot. Upon opening, the cow wishing to initiate milking enters and the automatic fence closes. A staging area to contain cows awaiting entrance through the gate is also useful and practice confirms that cows will use such a staging area. For this reason, when used, having a holding area 11b lends an added advantage in that the cows can freely visit the robot without being hindered by dominant cows which might loiter and block the milking cow's access to the robot. For that reason, many dairymen find it advantageous to have a holding area 11b.

Also, for the animals that for one reason or another do not visit the robot on their own accord, a holding area 11b is included in the exemplary barn layout 10. In practice such a holding area 11b may be made up of a number of fences to create a temporary holding area. When all the animals that have been fetched have visited the robot, the fences can be removed and the robot becomes accessible to the remainder of the herd again.

The holding area 11b may include a sorting area. Optionally, it will include automatic sort gates. The use of automatic sort gates in an AMS primarily helps the people in saving time and work. In conjunction with suitable herd management software, the operator/manager is in a position to guide the cows into specific areas based on defined characteristics or to sort them out completely. This is of particular use in a 24/7 operation and allows operation even when the operator/manager is only present in the barn at certain times. With automatic pre-selection, which decides whether a cow is due for milking or not, unnecessary visits to the milking robot can be avoided. The loading on the individual milking boxes is thus optimized and the waiting area not overburdened.

An automatic post-selection has the special advantage that conspicuous cows or cows that must be sorted out for special actions or treatment are placed exactly where they can be worked upon: in an extra area near to the robot. With the use of sort gates the operator/manager does not therefore necessarily have to run into the barn to look for cows. Such an activity is time consuming and means unnecessary stress for the rest of the herd in front of the robot. If, for instance, a veterinarian visits the farm, he can deal directly with the relevant cows, in the treatment area described herein.

Thus, in description, the instant invention presumes the division of the exemplary AMS barn three essential main areas: The 'normal' barn area for feeding and resting, the milking center with its functional areas and the interface area between the milking center and barn. By these divisions, the milking center comprising the robot area 11a is the first area of interest and then the interface or, collectively referred to herein, the holding area 11b. The selection gates come into use in this interface or holding area 11b. Depending on the type of barn the waiting area in front of the milking boxes is planned with the appropriate pre- and post-sorting gates. The size of the milking system and the optimum cow logistics are decisive factors in the exact design of this area. The exemplary barn presented herein is not constrained by any dimensions as particulars The cows have to reach the robot day by day of their own free will and without any disturbance. For this reason the transfer out of the 'normal' barn area to the milking boxes is a highly sensitive area while planning. It makes a significant contribution to whether the system is accepted by the cows or not. In principal one pre- and one post-sort gate would be necessary for a basic system.

Flush water collected from these four areas, the robot 11a, the holding pen 11b, the robot control room 12a and the milking room 12b is separately collected, thereby to be exploited for further flushing by the instant invention. The remainder of the exemplary barn 10 may be cleaned by any conventional manner of flush, flush/scrape or of scrape cleaning. Importantly, if by flush cleaning, it is important to note that the flush water used for the remainder of the barn 10 is cycled separately than that from these four areas. In that fashion, the relative cleanliness of the flush water from these four areas can be maintained in operation of the dairy.

Parenthetically, the inventor notes, in a modern dairy, flush water and manure are moved by employing high volume pumps. Flow through these pumps is selected to occur at a flow rate adequate to prevent settling of manure solids as the manure is transported. While pumps are not portrayed in these FIGS. 1-6, the presence of those pumps is presumed. Because the movement of pumped manure within a dairy is well-known, depicting individual pumps is not necessary to convey an understanding of the invention. Pumps are not shown. Where conduits between elements of the system are portrayed, pumps might be employed to assure the movement of manure through those conduits in actual operation. It is especially important to note that conveying water from the baffled tank will, in the preferred embodiment include high volume pumps to drive flush water through the nozzles.

While not relevant to the operation of the instant invention, we must move to the remainder of the barn 10, to briefly explain what lies there. Typically, a separation area 13 is included, preferably, and equipped with cubicles or as a straw bedded pen. So equipped, the area can be used for the short-term treatment of animals, such as immediately before or after insemination, or to separate cows when they require extra attention, such as new or lame cows.

Beyond a separation area 13, a good treatment box 14 is indispensable in achieving labor efficiency and convenience on the farm. In this exemplary barn, the treatment box 14 is configured such that an animal can be treated easily, quickly and safely by one person. As shown, the barn layout 10 is configured with feed alleys 15 along the side: all animals can reach the treatment box 14 without having to cross the feed alley 15.

To the same end, though also not to be included within the scope of the invention, the exemplary barn layout 10 also includes a close up dry cow pen 16a and in this exemplary dairy is placed adjacent to a calving pen 16b. Cows that calve unexpectedly can, then, be easily and quickly moved. Typically the close up dry cow pen 16*a* and the calving pen 16*b* are placed to afford access to the feed fence: in the calving area the animals must have access to fresh roughage and fresh drinking water. To save on labor, the calving pen 16*b* is placed in such a way that animals that have calved can easily be brought to the robot and back to the calving pen 16*b* or separation pen 13. As shown in this exemplary barn layout 10 visual contact between the cows in the calving area and the herd reduces stress on calving animals.

A second dry cow pen 16*c* encloses dry cows (they are often housed in the same barn as the dairy cows). The placement is such that the milk producing cows visiting the robot are not hindered by this group. This is of particular concern in combination with grazing. Usually, this means that dry cows in the same barn are conveniently housed located away from the robot.

Closed Circuit Flushing and Collection in a Baffled Tank

To demonstrate the instant invention's independence from the cleaning of the remainder of the barns, the remainder of the exemplary barn 10 might be cleaned by any of methods relying upon scrape, flush or a combination of the methods thereof. Free stall barn design, such as that of this exemplary barn 10, may include an alley with rows of free stalls 18 and a feeding alley 15, constructed parallel to each other. The resulting two straight alleys 19 are configured for very efficient manure removal by any conventional means. For example, to assure optimum performance, flushed surfaces may be sloped at 2 percent to 5 percent to provide adequate flow velocity for good cleaning and transport. Should this area (outside the scope of the invention, as stated above) be cleaned by scrape means, the kerbs and alleys can be configured to admit a skid steer blade for such cleaning.

Figure 2:
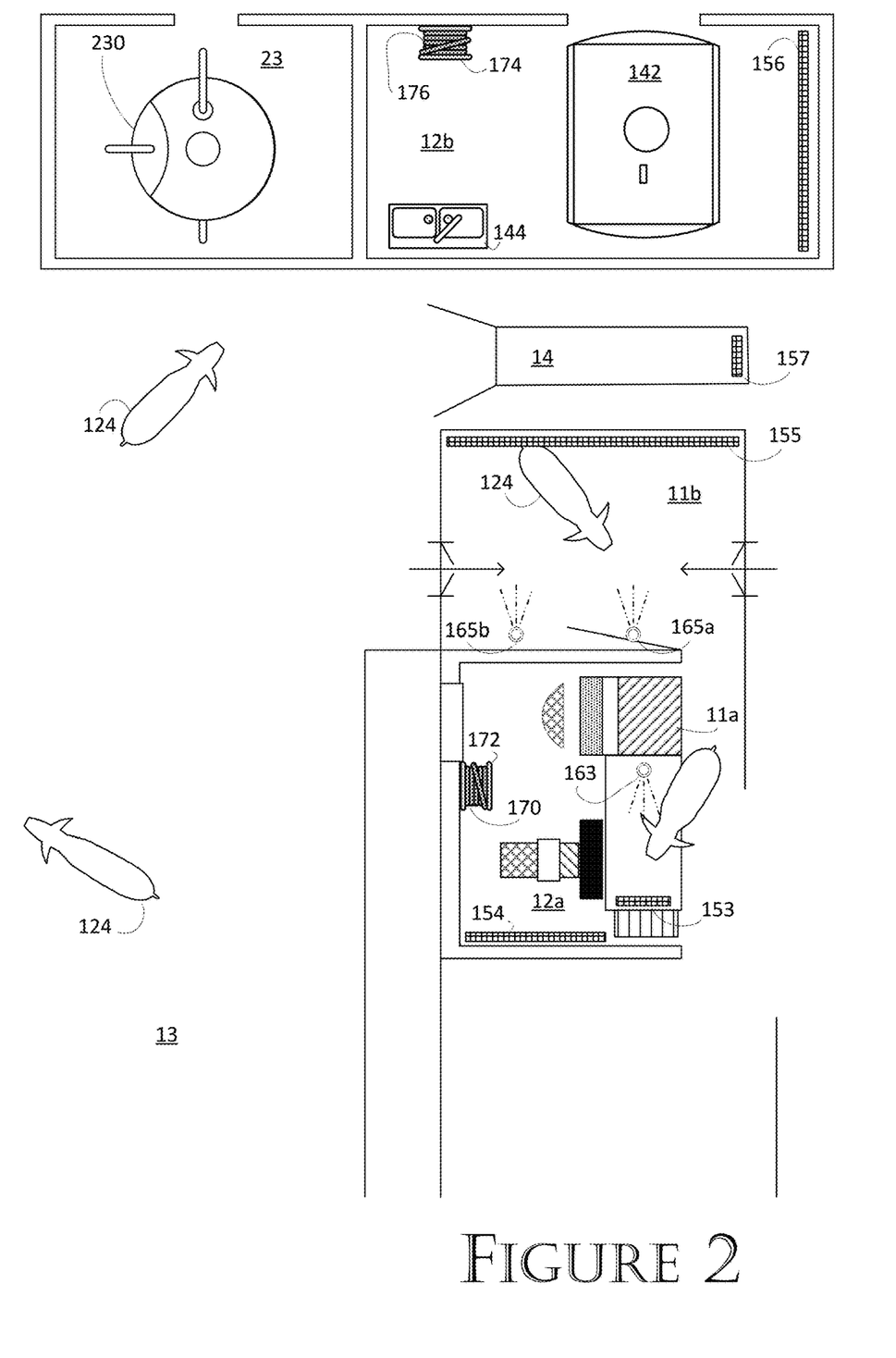
FIG. 2 is a detail of the plan-view of the exemplary single robot AMS dairy barn showing a robot, a robot control room, a holding pen, a milk room, and a baffled tank for storing flush water for this area of the AMS dairy barn.

Returning, then, to the scope of the instant invention, FIG. 2 is a detail illustration of the inventive portion of the exemplary dairy barn 10 depicting the four areas from which collected flush water could be used to supply the inventive flushing system. The milk room 12*b*, the robot 11*a*, the robot control room 12*a* and the holding area 11*b*, by design of the inventive flush system are treated distinctly from the remainder of the dairy barn 10 because the manure load anticipated from these area will be less within a given volume of flush water because, either, of frequency of washing (by design due to proximity to the robot 11*a* or the holding pen 11*b*) or by isolation from the traffic pattern of the accommodated cows such as in the milk room 12*b* or the robot control room 12*a*.

Neither of the milk room 12*b* nor the robot control room 12*a* will ever house cows. Water is introduced into the system as it comes from hoses on hose reels (176 on 174 in the milk room 12*b* and 170 on 172 in the robot control room 12*a*.) contains minimal contaminants. The purpose of water introduced through the hose is to wash down boots, milking tools, and surfaces. Relative to the flushing water collected from the alleys of the free-stalls, this water has very little particulate or milk in it. The water coming into either space is of the first quality or sanitary water and, in flushing, will only entrain minimal quantities of either milk, mud, or manure. A further source of water are the washing sinks 144 in the milk room 12*b*. Like the water from the hoses, water in the washing sinks 144 will be minimally contaminated given the normal use as washing sinks 144. As such, this water, too, is "nearly clean" and is suitable for reuse as flush water without any further processing. For this reason, the instant invention segregates water collected in either of the milk room 12*b* or the robot control room 12*a* as a special resource, distinct from the rest of the flush water if such is used elsewhere within the dairy barn. This nearly clean water runs into the robot water reclamation system 23 and is stored in a baffled tank 230 (FIGS. 1, 2 and 6) separate from the storage lagoon.

It is important to note that water collected from robot control room 12*a* and the milk room 12*b* is nearly pure. When collected and stored in the baffled tank 230, this is immediately suitable for reuse as flush water and no settling is necessary. Even when water collected from the robot 11*a* and from the holding area 11*b* are added, there is not enough entrained manure to spoil the quality of the water as it enters the baffled tank 230. To assure this water in the baffled tank 230 remains relatively pure, electronic monitors have been installed in the baffled tank 230 and these will indicate, by means, for example, of water conductivity, the presence of contaminants. Should the water in the baffled tank 230 loop require it (though, given the careful balancing of the regulated nozzles 163, this should very rarely be required), the system can draw cleaner water from either of the storage lagoon or from separators, such as centrifuges, the cleaner water introduced to dilute the collected water and reestablish the water quality within this closed loop system.

In a conventional dairy, flush water is stored in anaerobic lagoons. Lagoons are pondlike earthen basins which are sized to provide biological treatment and long-term storage of animal waste. A livestock lagoon is a small-scale waste treatment plant containing manure that is usually diluted with building flush water, as well as water wasted at animal waterers, and collected rainfall. In a lagoon, the manure becomes partially liquefied and stabilized by bacterial action before eventual land application. Lagoons may contain one of three types of waste-stabilizing bacteria—anaerobic (inhibited by oxygen), aerobic (requiring oxygen) or facultative (maintained with or without oxygen). Lagoons are larger than manure storage basins, which do not provide significant biological treatment and, frequently, are designed for shorter storage periods. Anaerobic lagoons decompose more organic matter per unit volume than aerobic ones. Due to the tremendous area required for aerobic lagoons to treat livestock waste, almost all livestock lagoons are anaerobic.

Anaerobic lagoons are a useful size and cost compromise between storage basins and aerobic lagoons. Anaerobic processes, which occur without free oxygen, liquefy or degrade organic wastes with high biochemical oxygen demand (BOD). Well-designed and well-managed lagoons still have a musty odor. Foul odors may indicate a malfunction. Even properly functioning lagoons may cause nuisance odors because of their size or location or because of topography or weather conditions.

Undesirable odors may be produced during seasonal (spring and fall) changes due to "turnover" and spring start-up after the winter period of relatively little biological activity. Initial start-up in late spring or early summer is preferred. Undesirable odors may drift off premises during atmospheric temperature inversions but would also be present in flush water drawn from that lagoon. In comparison with the stored water of the instant invention, flush water drawn from the lagoon cannot flush to the level of cleanness flushing the area around the robots as the instant invention can achieve.

By separate and inventive means from those used in the remainder of the conventional flush dairy barn, the area immediately adjacent to the robots 11*a*, using the instant invention, will be flushed frequently and that water will remain "nearly clean". Because the inventive barn 10 relies upon frequent wash-down of this area with minimal optimally applied volumes of water to assure cleanliness and dryness of this area, what water is used will entrain only the minimal manure or mud present in the washed down area. As shown, there are regulated nozzles 163, 165a, 165b which provide flush water to flush clean the flooring decking in the robot area 11a and in the holding area 11b respectively.

The flush water from the regulated nozzles traverses the decking entraining all of the milk and manure in its path. The milk and manure then flows with the flush water to be collected in grated drains 153 and 155 respectively. Importantly, timed valves open to supply these nozzles to flush the surfaces two or more times an hour to assure that such manure and tracked mud as may be present in the designated area is flushed while "fresh", as distinct from dried or ground in and is, therefore, easily carried away by these short, timed, and frequent flushes.

As stated above, monitors in the baffled tank 230 will also indicate, by means of, for example, water conductivity, the presence of contaminants. Also, as indicated above, should the water in the closed loop require it, the system can draw cleaner water from either of the storage lagoon or from separators such as centrifuges to reestablish the water quality of this closed loop system. In that manner, the flush water issues from the regulated nozzles such as depicted as 163 in frequent short intervals prevents the collection and drying of manure in the robot 11a and holding pen 11b areas and allows the rapid evaporative drying of the deck surfaces.

A salient feature of the invention is achieved in the ability of a technician to balance and to direct the flow through each of the several regulated nozzles 163, 165a, 165b. Once properly balanced and directed, the several regulated nozzles 163, 165a, 165b can be relied upon to spray only the precise amount of water necessary to flush each area such as the holding pen 11b and robot 11a.

By virtue of the "single retaining nut" design, the regulated nozzles 163, 165a, 165b are readily aimed and restricted by a technician using a single wrench to service a particular dairy barn 10. The nozzle heads 1633 (FIGS. 4, 5A, and 5B), are readily removed, replaced and directed with the removal of a single retainer nut 1632n, and upon removal, the same technician can exchange one restrictor plate 1630 for another in order to regulate the volume of water passing through the now-directed nozzle head 1633 in operation. Thus, due to the frugal use of water, the floor dries quickly and uniformly and yet the relevant areas have been flushed uniformly; all surfaces cleansed with minimally necessary volumes of flush water.

To drain flooring floor surfaces, known as a "deck" or "decking" and to avoid puddling of water, a minimum slope of 1.5 to 2% is recommended. This amount of slope is generally required because if the deck is made of concrete, for example, concrete surfaces are never truly planar. When wet, water collects in dished portions of the concrete floor surface, known as birdbaths, as a result of the inability to finish the surface as a perfect plane. Therefore, a slope of at least 1.5% drains the majority of liquids (urine, for example) from a free-stall alley, resulting in more rapid drying of alley surfaces. For that reason, in a system where flushing occurs at least twice per hour, it is advantageous for the health of herd to assure that the flushes have no greater duration than five minutes. Where longer durations are used, the flooring deck is not given sufficient time to dry out.

Experience has shown that providing a 5 feet per second flow velocity at a 3-inch depth for at least 10 seconds will provide acceptable cleaning in the alleys. A 3 percent slope on the flushed area will provide these conditions with the least water volume and discharge rate requirements. Slopes flatter, or steeper, may require more water volume and higher discharge rates. For the optimum 3 percent slope, flush volumes of about 100 gallons per foot of width of the area being flushed have proven effective, though temperature, humidity, diet, and other factors may allow judicious adjustment of this volume to achieve optimal flushing.

Flush water collected in a grated drain 156 in the milk room 12b and flush water collected in a grated drain 154 in the robot control room 12a will also be minimally contaminated. Water collection in each of the milk room 12b and the robot control room 12a occurs on a "as needed" basis. If the dairyman not had the need to enter either of the milk room 12b nor the robot control room 12a, there is no water collected in either grated drain 154 or 156, as no water is used in either room in the given interval. When the dairyman does enter either place, washing of boots and deck occurs before what work summoned him and the volume of tracked mud is minimal. In either of the instance of the milk room 12b or of the robot control room 12a, to reach the space in question, the dairyman has already traversed a presumptively clean deck around either of the robot 11a or the holding pen 11b.

Controlled Direction of Regulated Flush Water

Figure 3:
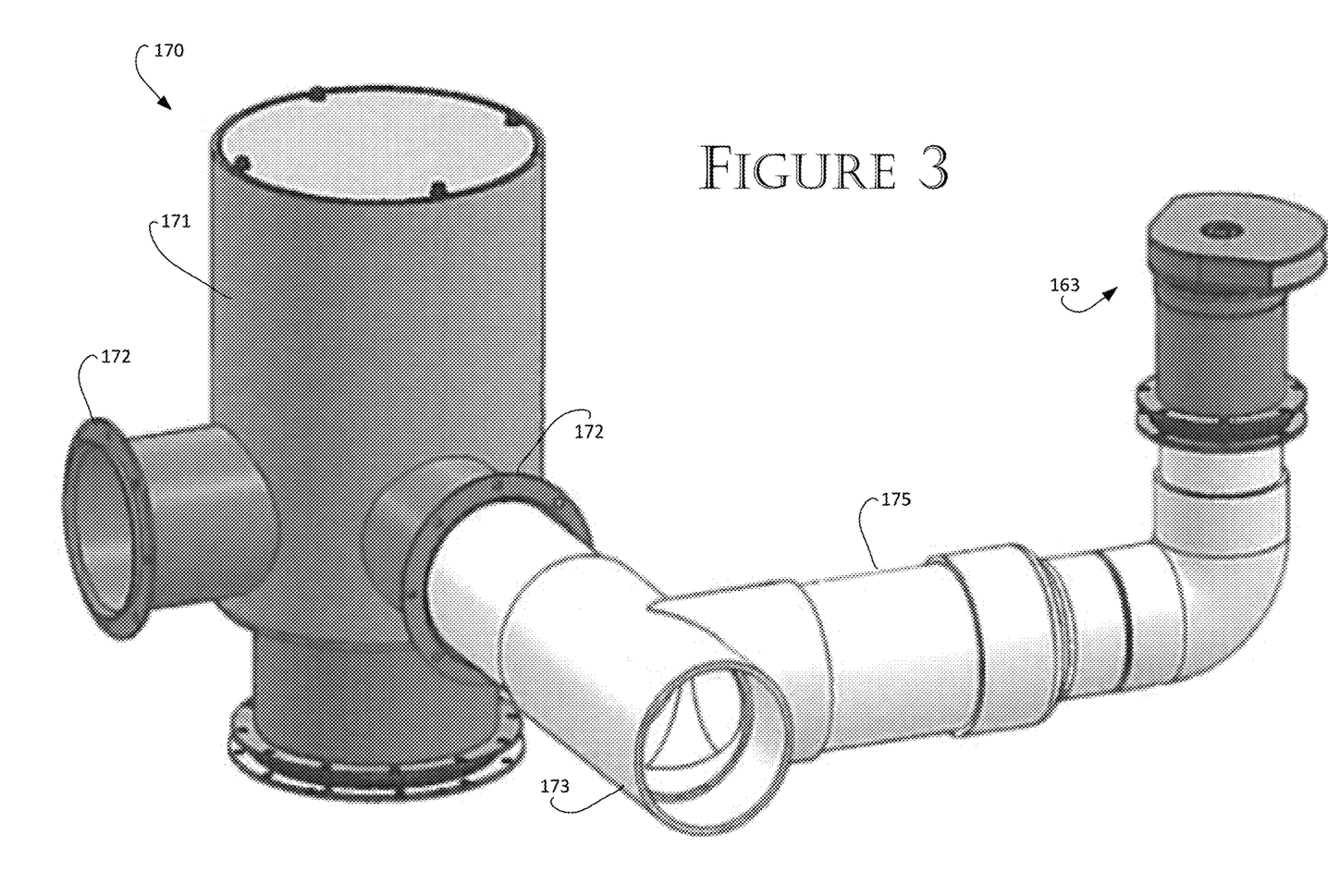
FIG. 3 shows a single leg of a flush water distribution network exploiting regulated nozzles for spraying flush water onto selected areas of a dairy barn.

To understand this network 170, to follow a flow of water is instructive. Water is admitted into the distributor body 171 from below and at pressure. Butterfly valves, within the valve bodies 172, (butterfly valves are used in the preferred embodiment, though gate valves, ball valves, globe valves, or angle valves, for example, could serve as well without departing from invention) are each controlled by separate pneumatic activators allowing each to open the connected butterfly to initiate or close the butterfly to terminate a flow of flush water through the valve bodies 172. When a valve is open, the water flowing through it is distributed through tees 173, along pipes 175 to one of the several regulated nozzles 163. Due to flow regulators in the form of restrictor plates 1630 (FIG. 5A), selected based upon intended flow of flush water into the associated region of the barn 10, a single opening of the butterfly valve can flush through several nozzles with a tailored volume of water, avoiding excess water ponding in "birdbaths" on the deck surface. Given the slope of the decking and minimal volumes used, the deck quickly dries. Neither hooves nor teats suffer from undue moisture under the inventive system and method.

Moving to FIG. 3, where the distribution network 170 to feed regulated nozzles such as 163 is depicted, where one of the regulated nozzle 163 is shown to reside on one of the several branches of a distributed network of piping 175. In the depicted instance, only one such branch and one tee 173 are shown for clarity of explanation. The reader is asked to understand that several such tees 173 can be ganged to form a manifold (not shown in entirety) to feed a number of regulated nozzles such as that depicted as 163. The interplay of pressurized volume through a distribution network 170 and individually restricted through the regulated nozzles 163 controls flow of water down each leg of the tees 173.

Figure 4:
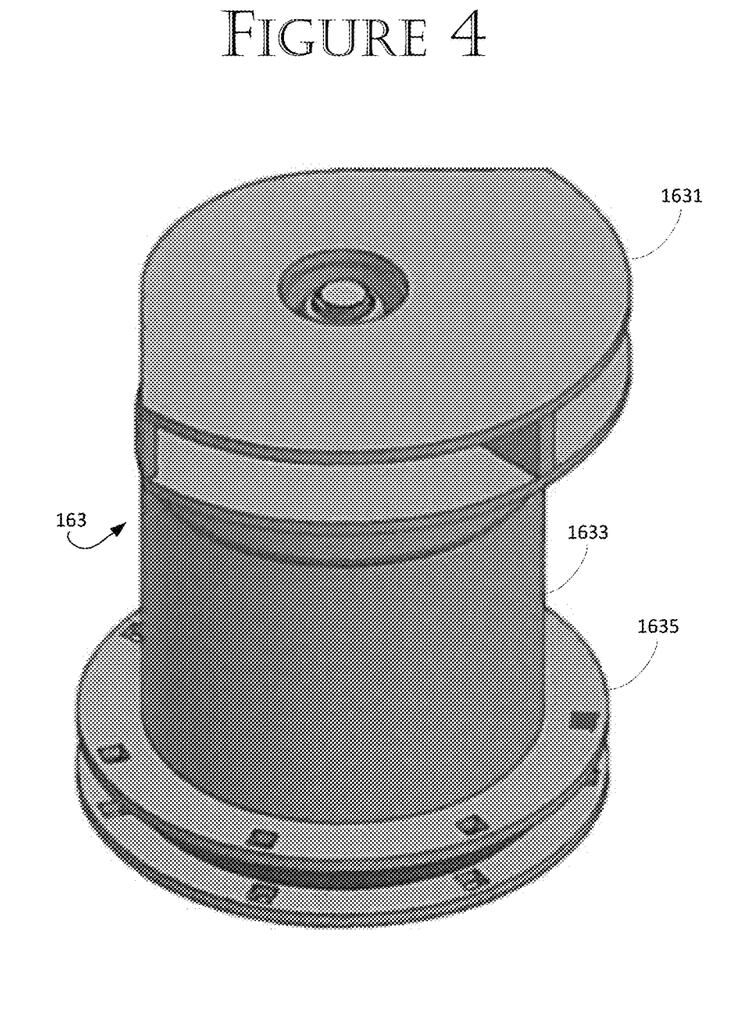
FIG. 4 is a perspective view of the regulated nozzle outside of its embedment in a deck of an AMS dairy barn.

The regulating nozzle 163, as set forth above, enables the proportionate distribution of water through the network 170. In FIG. 4, three main sections of the regulated nozzle 163 are depicted. First, a flange 1635 allows dry secure joining to the pipes 175 (FIG. 3). A regulator body 1633 conveys water from the pipes 175 over a selected regulator plate 1630 (FIG.

5), into the rotatable nozzle head 1631. By directing the nozzle head 1631 and selecting a suitable regulator plate, the dairyman can precisely control the direction and flow of flush water used to flush any one of the several areas in the dairy barn 10.

Referring, then to each of FIGS. 3 and 4, by way of non-limiting example, an exemplary single butterfly valve may be pneumatically opened, and upon opening to admit 2,000 g.p.m. (gallons per minute) and distribute that flow out to several differing sizes of pipes 175 through several tees 173 to supply regulated nozzles in the several areas to be flushed. A first area, for example, may require 400 g.p.m. through two regulating nozzles 163 and 200 g.p.m. through a third nozzle 163 and 100 g.p.m. through five further placed nozzles 163.

To further explore this example, given the volumes set out, timers are used to time the pneumatic (pneumatic in the preferred embodiment—preferred as it separates water and electrical components, though the instant invention could be based upon servo-electric valves as well) activators opening the butterfly valve to supply the several regulated nozzles 163 for a duration of from 10 to 60 seconds ("contact time") flushing the designated area every 15 minutes or 30 minutes. One virtue of the network as described, is that the alternate opening and closing of a single valve controls pressurization of and flow through the several regulated nozzles. The several flow restricting plates, one within each nozzle, distribute the volume of flush water among the several nozzles. By directing and limiting the flow through each nozzle, the whole of the area will be optimally flushed to maintain the high level of cleanliness within the area as described. Observation indicates that a contact time of at least 10 seconds improves cleaning efficiency, though at any relevant spot on the floor fresh manure can be entrained with flush water flowing at a flush velocity of 3 feet per second and a contact time of 5 seconds thus, may be sufficient to clean the area.

Periodic flushing can be achieved by any of a number of conventional means. In the preferred embodiment, the valve is normally closed and opened by activation. In this preferred embodiment, a electrical solenoid acts directly on a controlling valve. The controlling valve, known as a pilot, is used to actuate a larger valve pneumatically. Piloted valves require much less power to control, but they are noticeably slower. Piloted solenoids usually need full power at all times to open and stay open, where a direct acting solenoid may only need full power for a short period of time to open it, and only low power to hold it. An alternate embodiment might include such a direct acting solenoid. In either fashion, timing can be achieved by, for example, any of an electronic timer, a processor such as a computer, or a simple electromechanical timer. In any of the suggested configurations, the key objective is assure that frequent flushings occur within the designated areas 11a, 11b, 12a, and 12b. As stated throughout, these flushings are not as long in interval but more frequent than that conventionally used in a flush dairy. For example, in a preferred embodiment, flushing occurs at least as frequently as every half hour. To achieve a similarly effective result, a laborer must attend to each robot area cleaning it by hand scraping and washing for between ½ to 1 hour per day at a frequency of between 2 to 4 times each day. Rather, the inventive method and system realizes an immediate savings in labor.

Figures 5A, 5B:
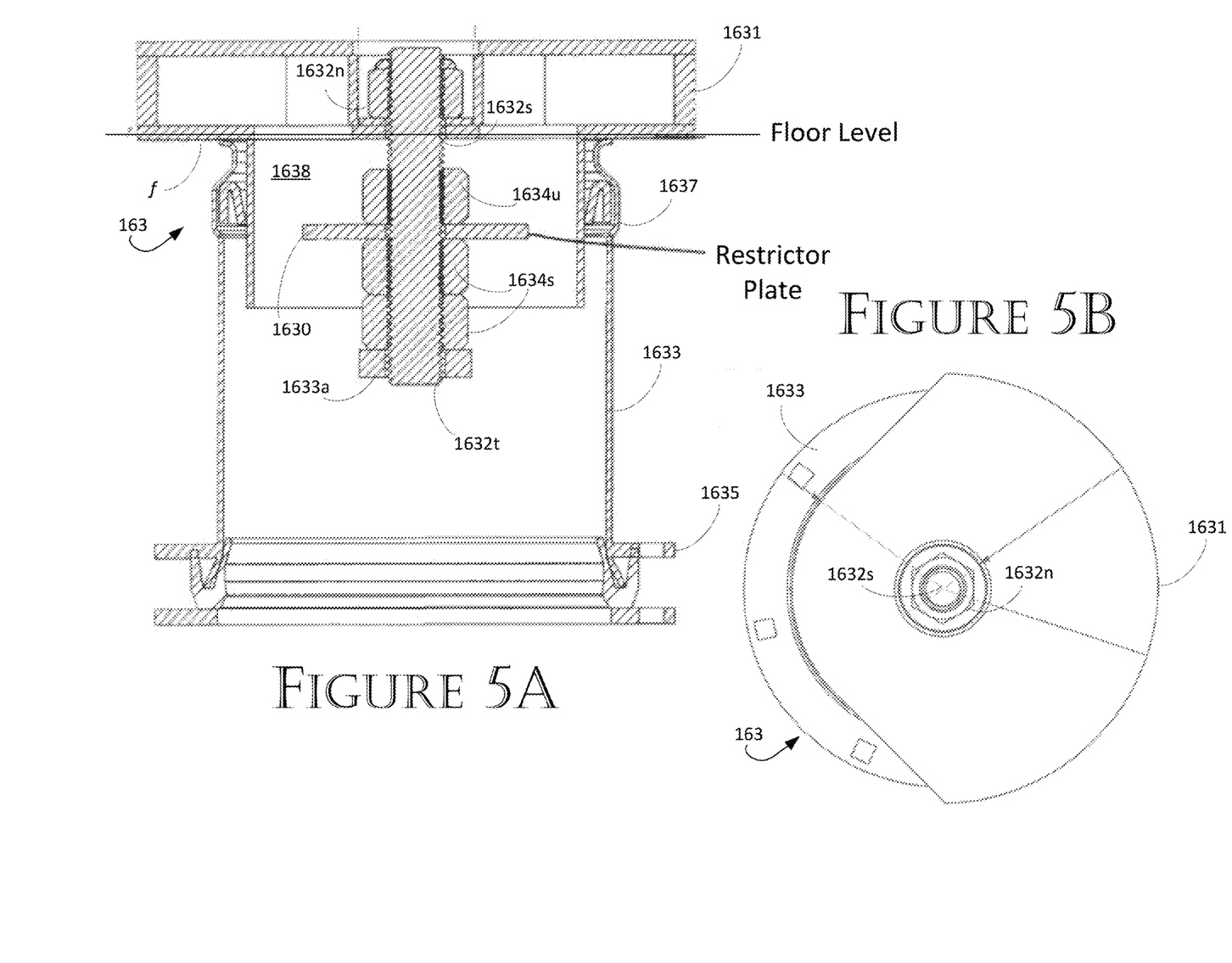
FIG. 5A is a cross-sectional view of the regulated nozzle depicting a throat and a flow restrictor plate.
FIG. 5B is a plan view of the regulated nozzle depicting a directional orientable nozzle head and retaining nut.

In FIGS. 5A and 5B, the features of the regulated nozzle 163 are depicted in greater detail. FIG. 5A depicts a cross-section of the regulated nozzle 163. The flange 1635 for joining to the pipes 175 (FIG. 3) is visible and of conventional configuration. The regulator body 1633 conveys water received from the pipes 175 flows into a throat 1638 where the volume of flow is metered by a restrictor plate 1630. The restrictor plate 1630 is selected by a technician in order to designate a selected flow rate.

For example, various plates of specific diameters occlude a known portion of the throat 1638 thereby specifying the flow rate the regulated nozzle 163 will deliver. In a preferred embodiment, the volume of water that might flow through the exemplary single butterfly valve as it is pneumatically opened might be sufficient to flush a total of 2000 sq. ft. As envisioned, the regulated nozzle with no restrictor placed within could clean 500 sq. ft for each. A regulated nozzle with a small restrictor would clean an area of 100 sq. ft. By using such metrics, a technician can readily design an optimal flushing of a selected area of decking in that the technician need only place as many valves as are needed to flush that selected and known area. Advantageously, a standardization of the throats 1638 and plates 1630, would allow a technician to balance the flows of several regulated nozzles 163 to assure optimal flow in each designated area. It is envisioned that kits of plates will be available to technicians in order to tailor the flow of each regulated nozzle, relative to the remaining nozzles in the distributed network. In an non-preferred embodiment, distinct nozzle heads 1631 are selected which will fit interchangeably into the nozzle body 1633, each nozzle head having a distinct flow rate and, optionally, a distinct spray pattern, to further tailor the flow of flush water through the nozzle 163.

In the nozzle 163 shown in FIG. 5A, a threaded shaft 1632s is set into a threaded aperture 1633a fixed within the regulator body 1633 at the terminal end 1632t of the shaft. Selected threaded nuts 1634s support the restrictor plate 1630 positioning it at the center of the throat 1638. An upper threaded nut 1634u secures the restrictor plate against movement when urged by upward current through the throat 1638, thus, locking the plate 1630 relative to the throat. The threaded shaft 1632s extends further through the nozzle head 1631 which, itself is retained by a retainer nut 1632n. Thus, by the removal of two nuts, the retainer nut 1632n and the upper threaded nut 1634u, the technician can install an appropriate restrictor plate 1630, install the upper threaded nut 1634u, and then the technician can rotate and orient the nozzle head 1631 (which is highly directional as shown in FIG. 5B). Pressing downward, a gasket engages the throat 1638 to seal the head to the regulator body preventing water from escaping the regulator body. Then, satisfying herself that the nozzle head 1631 is properly oriented, the technician can tighten the retainer nut 1632r, to fix the orientation of the nozzle head 1631.

In one embodiment of the present invention, the lower rim of the nozzle head 1631 defines radial grooves and the upper rim of the regulator body 1633 has corresponding lands to engage the nozzle head 1631 thereby to lock the orientation of the nozzle head 1631 relative to the regulator body 1633 when the retaining nut 1632 is tightened against the nozzle head 1631 on the shaft 1632s, thereby locking the direction and spray area of flush water, issuing from the nozzle head, relative to the floor of the barn 10.

The cross-section of the regulated head, as illustrated in FIG. 5A, shows that the whole of the regulator body is advantageously sunk into the floor such that the floor level f intersects the head at the juncture between the nozzle head 1631 and the regulator body 1633. Thus, only the nozzle head 1631 extends a very short height over the floor level assuring that cows will not be tripped up by the protuberance of the nozzle head 1631 from the floor.

Figure 6:
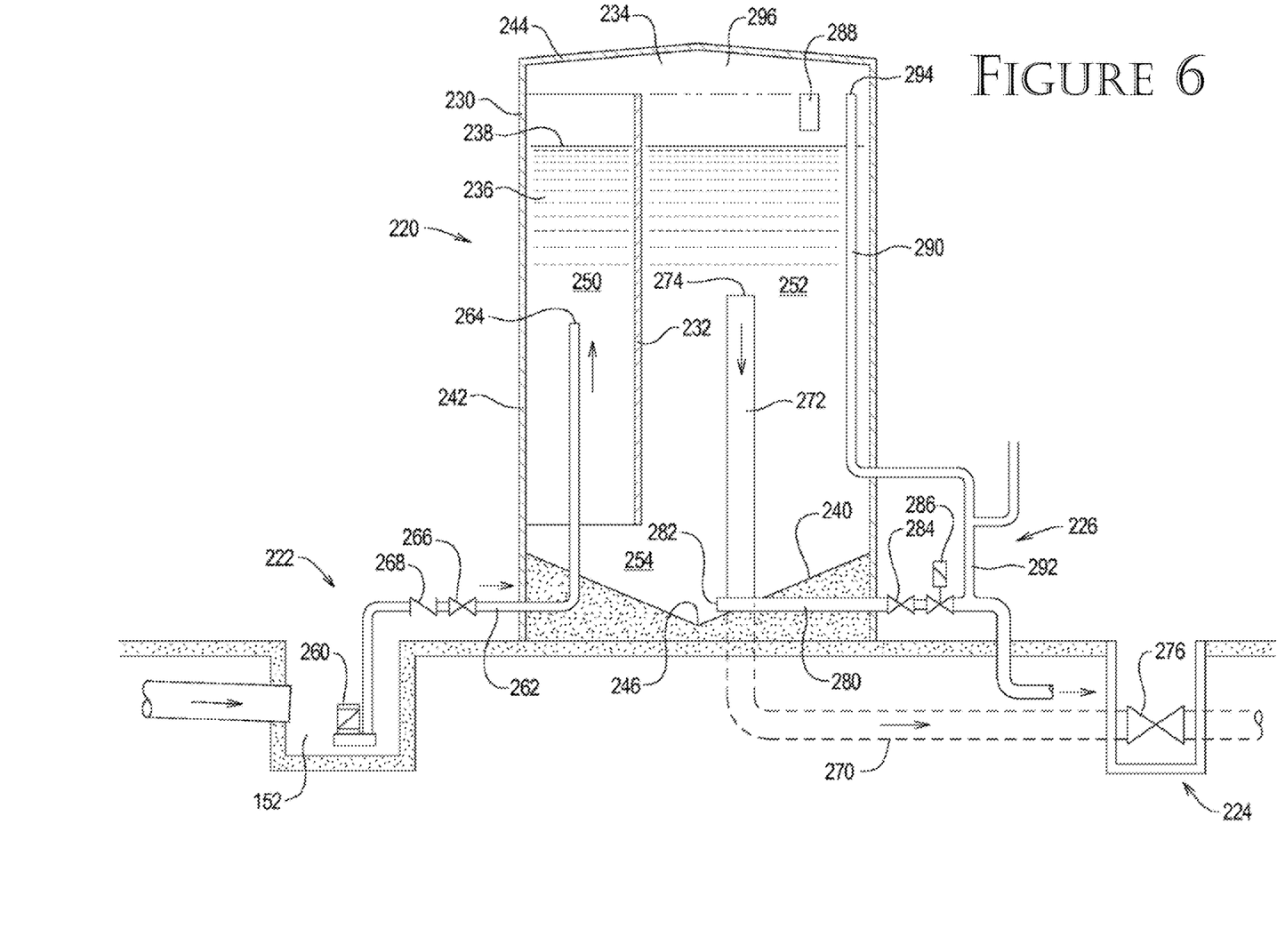
FIG. 6 is a cross-section of the baffled tank for storage and separation of particulate from flush water such as is used in the area of the exemplary AMS dairy barn depicted in FIG. 2.

Referring now to FIG. 6 which depicts the baffled tank 230. As has been amply stated, because, by volume, the collected flush water contains fewer instances of particulate and milk, such a tank 230 lends itself well in forming a part of the closed loop for robot flushing 23 described above. The closed loop for robot flushing 23 comprises a collection system 222, a flush system 224 (each as described, in part above), and a waste system 226 (for removal of settled particulate). In the idealized dairy barn 10, a tank room 23 houses a baffled tank 230 formed by a bottom wall 240, a side wall 242, and an upper wall 244. By way of nonlimiting example, here, the side wall 242 is substantially cylindrical. In operation, collected flush water 236 is admitted into settling chamber 234 on a first side of the bulkhead 232. As the settling chamber 234 collects flush water, the fluid level 238 rises within the baffled tank 230. By directing the incoming flow of flush water at the bulkhead 232, the compression of air entrained in flush water that occurs upon collision with the bulkhead drives much of the air from the flush water. Thus, the bulkhead contains turbulence in two ways and promotes the settling of particulate from the collected flush water.

By way of overview, flush water used in any dairy, conventional or pursuant to the instant invention, entrains a great deal of ambient air as it tumbles over the concrete surfaces that make up the decking of the dairy. This entrained air, by its buoyancy will stir any tank it is admitted to. Between the turbulence the velocity of the flow of flush water as it enters and the further turbulence induced as the air escapes the flush water, particulate will remain suspended much longer in the water in the tank. The space between the tank wall and the bulkhead prevents this turbulence by containing the flow of flush water and by the bulkhead slowing that flow, and by stifling this turbulence, allowing the air to escape before joining the remainder of fluid in the tank.

A bulkhead 232 divides the settling chamber 234 into an inlet compartment 250 and a reservoir compartment 252. The inlet compartment 250 is arranged between the side wall 242 and an inlet side of the bulkhead 232, while the reservoir compartment 252 is arranged between the side wall 242 and a reservoir side of the bulkhead 232. The bulkhead is affixed to the inside of the baffled tank and is placed to reduce the horizontal velocity component of the total velocity field imparted on the fluid by admitting flush water to the baffled tank 230. Without the bulkhead 232, admitted flush water will stir up the collected flush water within the tank resulting in more particulate being held in suspension.

Each of the reservoir compartment 252 and the inlet compartment 250 are open at their lowest extreme to allow particulate to settle into a slurry basin 254. In the preferred embodiment, the bottom wall 240 is shaped as an inverted cone having a vertex at its lowest point 246. The bottom wall 240 serves as a funnel to convey settled particulate into the lowest point 246. The lowest point 246 within the settling chamber 234 is arranged at the bottom of the slurry basin 254 to allow collection and removal of particulate from the baffled tank. Sedimentation is very effective in removing solids from cattle manure. Testing with dairy manure has indicated that sedimentation, as described herein, effects separation on a dry-mass basis can range from 15 to 60 percent efficiency depending on the total solid content of the collected flush water 236. Dairy manure contains large amounts of fiber that is easily separated. With collected flush water containing between 5 to 6 percent total solids, approximately 60 percent of the solids will settle by gravity sedimentation within 10 minutes of introduction into the settling chamber 234.

As gravity urges solids in the collected flush water 236 to precipitate out of suspension into the slurry basin 254, accumulated resulting slurry must be removed through a waste system 226. The waste system 226 comprises a waste conduit 280 that extends between the baffled tank 230 at the base of the slurry basin 254 and conveys the slurry to a waste lagoon (not shown) or manure dewatering device, such as a centrifuged. In particular, the waste conduit 280 defines a waste conduit inlet 282 that is arranged within the slurry basin 254 of the settling chamber 234 proximate to its lowest point much like a drain in a sink. The waste conduit inlet 282 receives accumulated slurry from within the settling chamber 234.

As has been stated above, the baffled tank 230 is used to collect flush water from the decks of four areas within the dairy, the immediate periphery of the robot area 11a, the holding area 11b, the robot room 12a and the milk room 12b. The grated drains 153, 154, 155, and 156 (FIG. 2) are part of a flush water collection system 222 for filling the baffled tank 230. The flush water collection system 222 may, also, include a sump pump 260 arranged in a sump pit 152 beneath the grated drains 153-157 (FIG. 2). A flush water collection conduit 262 receives collected flush water from the sump pump 260 and conveys it through the flush water collection conduit outlet 264 into the settling chamber 234 at the inlet compartment 250. Optionally, such controls as a manual valve 266 and a check valve 268 are arranged in this exemplary embodiment of the flush water collection conduit 262 between the sump pump 260 and the flush water collection conduit outlet 264 outside of the settling chamber 234 to prevent overfilling of the settling chamber 234.

As stated with reference to the several figures, the flush water collection system 222 operates to collect the cleaner flush water from the area immediately around the robot 11a including the robot control room 12a, the milk room 12b and the holding area 11b. The cows 124 enter the robot 11a passing through the holding area 11b. Manure that the cows deposit in either the holding area 11b or within the robot itself 11a is flushed by the periodic flush down from several placed regulated nozzles 163, 165A, 165B167 and into the grated drains. Similarly manure and mud tracked into either of the milk room 12b or the robot control room 12a is rinsed into the grated drains in either location. Grated drains 153-157 are present in each location and each have a lower surface sloped downward toward the sump pit 152 where collected flush water along with entrained mud and manure is drawn into the sump pump 260.

The sump pump 260 conveys the flush water, manure and mud to the inlet compartment 250 of the settling chamber 234. Because of the rapidity of separation by sedimentation in the presence of the bulkhead 232, flush water supplied to the flush system 224 from the interior of the settling chamber 234, through a primary flush conduit 270 will be nearly pure water. The primary flush conduit 270, exploits a standpipe 272 within the settling chamber. The height of the standpipe 272 elevates a standpipe inlet 274 above any settled particulate or slurry and draws clear flush water to charge the regulated nozzles 163.

Intake and out flow from the settling chamber 234 are controlled by exterior valves. Optionally, a manual valve 276 is arranged in the primary flush conduit 270 outside of the settling chamber 234. The check valve 268 prevents fluids from flowing back through the system, either into the sump pump 260 or into the sump pit 152, which would normally deposit. The manual valve 266 may be used to accommodate servicing of the closed loop for robot flushing 23, including cleaning of the baffled tank 230. A manual valve 284 and a control valve 286 may, likewise, be arranged in the waste conduit 280 between the waste conduit inlet 282 and the waste lagoon or dewatering device located outside of the settling chamber 234.

The waste system 226 further comprises an overflow conduit 290 connected to the waste conduit 280 and a vacuum break conduit 292 connected to the overflow conduit 290, to shunt excess flush water to a storage water lagoon (not shown). The overflow conduit 290 initiates at an overflow inlet 294 located at a highest acceptable fluid level 238 within the reservoir compartment 252 of the settling chamber 232; the overflow inlet 294 is arranged at a third level within the settling chamber 232. A headspace region 296 of the settling chamber 232 is defined above the fluid level 238 of the collected flush water 236 within the settling chamber 232.

In one embodiment of the invention, the control valve 286 may be provided for automatic removal of waste based on predetermined parameters. A control valve sensor 288 is arranged on the tank side wall 242 within the settling chamber 234 to alert the dairyman of the collection of an excess of flush water within the settling chamber 234. For example, the control valve sensor 288 may be configured to actuate the control valve 286 when the baffled tank 230 is full, thus allowing effluent to exit through the waste conduit 280 to a manure handling system such as a treatment lagoon (not shown). In one form, the control valve sensor 288 comprises a level probe or float valve. The control valve 286 may take the form of an air-actuated valve such as a knife valve. This use of a control valve 286 and control valve sensor 288 allows for the mainly solid fraction to be removed constantly as the baffled tank 230 fills.

As generally described above, the overflow conduit 290 may be provided, with the overflow inlet substantially at or just below the upper wall 244 of the baffled tank 230, indicating the upper limit of the volume capability of the baffled tank 230. The overflow conduit 290 therefore functions as a standard overflow and vacuum break whereupon the effluent and water within the baffled tank 230, upon reaching the overflow inlet 294, flows through the overflow conduit 290 into the waste conduit 280 and, as previously described, out toward the manure handling system.

The vacuum break conduit 292 is provided to maintain neutral pressure between the headspace 296 and atmosphere. The use of a vacuum break such as the vacuum break conduit 292 is helpful to maintain proper operation of the closed loop for robot flushing 23 as the volume of fluid/solid changes due to influx of collected flush water from the flush water collection conduit 262 and/or withdrawal of material from the tank 230. The vacuum break conduit 292 or another vent may be utilized to allow the gas (air) fraction filling the headspace 296 to be withdrawn without requiring the gas fraction to be vented through the waste conduit 280.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The embodiments of the invention in which an exclusive property or privilege is claimed are defined as follows:

1. A method for flushing an area of a robotic harvest dairy barn, the method comprising:
    defining areas for cleaning from within a dairy barn; the areas including any of:
        an area immediately surrounding a robot;
        a holding area for staging cows for milking at the robot;
        a robot control room; and a milk collection room;
    providing flooring decks, at least one in each of the defined areas, each provided flooring deck configured to slope at its upper surface to define a drain area, the drain area including at least one grated drain positioned to collect any liquid deposited on the upper surface of the provided flooring deck;
    providing a collecting pipe network, the provided collecting pipe network configured to conduct liquid collected in the at least one grated drain to a baffled tank; providing the bathed tank to collect liquid from the collecting pipe network; providing a distribution network, the distribution network initiating at the baffled tank and terminating in at least one regulated nozzle positioned in at least one provided flooring deck to rinse an upper surface of the at least one of the provided flooring deck; and
    periodically activating at least one valve within the distribution network, the activation of which initiates a flow of flushing water drawn from the baffled tank issuing through the at least one regulated nozzle to flush the upper surface, the flushing water flowing into the at least one grated drain the deck defines;
    wherein the at least one valve is configured for use with a timer; and
    wherein the at least one nozzle is configured for use with a restriction plate.

2. The method of claim 1, wherein periodically activating includes activating the at least one valve within the distribution network with a periodic frequency of at least twice an hour during operation and having an interval of no more than five minutes.

3. The method of claim 1, wherein providing the baffled tank, includes providing a baffled tank comprising:
    a tank enclosing a settling chamber, the settling chamber comprising:
        an input chamber defined by a portion of a side wall of the tank and an input side of a bulkhead the tank contains;
        a reservoir chamber defined by a further portion of the side wall and a reservoir side of the bulkhead;
        a slurry basin situated beneath each of the input and reservoir chambers and defined by a still further portion of the side wall and the bottom wall, the bottom wall being configured in a generally inverted conical shape, the slurry basin configured to receive settled particulate from either of the input chamber or the reservoir chamber within the tank.

4. The method of claim 3, wherein providing the baffled tank includes the further step of conducting out of the tank such settled particulate received in the slurry basin through a waste conduit inlet into a waste conduit for collection outside of the tank.

5. The method of claim 1 wherein providing the distribution network includes:
    directing a directable nozzle head the regulated nozzle includes so as to direct flush water flowing through the regulated nozzle to flush the upper surface of the flooring deck into which the regulated nozzle is positioned; and installing one selected restriction plate from a plurality of restriction plates into a throat the regulated nozzle comprises, each restriction plate being configured to occlude a selected area within the throat, the one selected restriction plate configured to admit a limited flow of flush water selected to supply adequate flush water to effectively flush the upper surface of the flooring deck into which the regulated nozzle is positioned.

6. The method of claim 5, wherein providing the distribution network includes providing a plurality of regulated nozzles, such that the activation of the at least one valve within the distribution network initiates a flow of flush water through each of the plurality of regulated nozzles, the flow through each of the regulated nozzles being proportioned through each of the regulated nozzles according to each restriction plate installed in the regulated nozzle.

7. The method of claim 1, wherein periodically activating the at least one valve is periodically activating a pneumatic activator within the at least one valve within the distribution network.

8. The method of claim 7, wherein periodically activating is activating by one of a electro-mechanical timer, an electronic timer, and a processor.

9. A method for flushing at least one flooring deck of a robotic dairy comprising:
defining the flooring deck to include:
an area immediately surrounding a robot,
a holding area for staging cows for milking at the robot;
a robot control room; and
a milk collection room;
positioning a plurality of regulated nozzles, each regulated nozzle being positioned in a selected flooring deck, each regulated nozzle being directed to issue flushing water upon a selected portion of the flooring deck in which the regulated nozzle is positioned, wherein at least one of the plurality of regulated nozzles includes a flow restrictor situated within a throat, the flow restrictor being selected to occlude a designated area within the cross-section of the throat and, thereby to regulate flow through the nozzle;
connecting each of the regulated nozzles to a baffled tank by means of a corresponding actuatable valve, the baffled tank being configured to retain flushing water in a settling chamber;
collecting flushing water from the flooring deck in drainage conduits from positioned drains in the flooring deck, the flushing water including entrained manure and waste milk deposited on the selected flooring decks the dairy includes, the collected flushing water being retained in the baffled tank; and
selectively actuating each actuatable valve at selected times, the times being selected based upon the position and the selected flooring deck in which the regulated nozzle is positioned, in accord with the actuatable valve with which the regulated nozzle corresponds;
wherein each actuatable valve is configured for use with a timer.

10. The method of claim 9 further comprising:
installing a the flow restrictor for each of the plurality of regulated nozzles, the flow restrictor being selected from a set of flow restrictors, each flow restrictor of the set of flow restrictors being configured to limit flow through the nozzle to a unique volume per minute, whereby installation of a flow restrictor is configuration of that regulated nozzle to deliver a specific volume of water upon activation of the valve.

11. The method of claim 9 wherein positioning a plurality of regulated nozzles further comprises:
directing each of the plurality of regulated nozzles, each of the plurality of regulated nozzles having a nozzle head characterized by a directional spray pattern, the nozzle head being rotatable such that the spray pattern may be directed to strike a selected area on an upper surface of flooring deck into which the regulated nozzle is installed.

12. The method of claim 11 wherein directing each of the plurality of regulated nozzles includes rotationally fixing the nozzle head by the tensioning of a retention nut securing the nozzle head to the nozzle body.

13. The method of claim 9, wherein selectively actuating each actuatable valve at selected times is performed by a timer is selected from a group consisting of an electronic timer, an electro-mechanical timer and a processor.

14. A method for cleaning a subset of the decking surface in a barn configured at to accommodate at least one robot for robotic milking of cows, the subset of the deck surface being selected to include at least an area of the deck immediately adjacent to the at least one robot, the method comprising:
letting grated drains into the subset of the decking surface to collect flush water used to flush down the subset of the decking surface;
providing a baffled tank to collect all flush water in the grated drains, the baffled tank enclosing a settling chamber;
providing a distribution network including a high-volume pump for drawing flush water from the baffled tank to issue through a plurality of regulated nozzles;
directing each of the plurality of regulated nozzles having directable nozzle heads to flush the subset of the decking surface;
setting a timer to activate valves within the distribution network allowing flush water to issue through the plurality of regulated nozzles, the timer set to flush at intervals of no less than twice an hour for a duration of no more than five minutes during each activation;
wherein each of the plurality of regulated nozzles are configured for use with a flow restrictor.

15. The method of claim 14, wherein directing each of the plurality of regulated nozzles having directable nozzle heads includes:
selecting a flow restrictor to admit flush water into the nozzle head at a designated rate.

16. The method of claim 14, wherein the nozzle head is a rotatable nozzle head such that rotation of the nozzle head is performed to direct a spray pattern of flush water onto the subsection of decking surface, when flush water is issuing through the nozzle head.

17. The system of claim 14, wherein setting the timer to activate valves within the distribution network includes:
setting the timer selected from a group including electro-mechanical timers, electronic timers, and processors.

18. The method of claim 14, wherein providing a baffled tank to collect all flush water includes:
providing each of an intake chamber, a reservoir chamber and a slurry basin, the slurry basin configured to remove particulate from the tank.

19. The method of claim 14 wherein providing a distribution network includes:
providing a manifold; and controlling a flow through the manifold by activating a pneumatically-controlled valve.

* * * * *